(12) United States Patent
Bauer et al.

(10) Patent No.: US 11,509,121 B2
(45) Date of Patent: Nov. 22, 2022

(54) ELECTRICAL ENERGY TRANSMISSION DEVICE AND LIFE CYCLE MANAGEMENT

(71) Applicant: Siemens Energy Global GmbH & Co. KG, Munich (DE)

(72) Inventors: Sascha Bauer, Berlin (DE); Bernhard Lutz, Berlin (DE); Frank Ehrlich, Hohen Neuendorf (DE)

(73) Assignee: Siemens Aktiengesellschaft, Munich (DE)

( * ) Notice: Subject to any disclaimer, the term of this patent is extended or adjusted under 35 U.S.C. 154(b) by 700 days.

(21) Appl. No.: 16/326,424

(22) PCT Filed: Jul. 19, 2017

(86) PCT No.: PCT/EP2017/068177
§ 371 (c)(1),
(2) Date: Feb. 19, 2019

(87) PCT Pub. No.: WO2018/033332
PCT Pub. Date: Feb. 22, 2018

(65) Prior Publication Data
US 2021/0336479 A1    Oct. 28, 2021

(30) Foreign Application Priority Data
Aug. 19, 2016    (DE) .......................... 102016215598.9

(51) Int. Cl.
*H02B 13/055*    (2006.01)
*H02B 5/06*    (2006.01)
(Continued)

(52) U.S. Cl.
CPC ................. *H02B 5/06* (2013.01); *F17C 5/06* (2013.01); *F17C 7/00* (2013.01); *H02B 13/035* (2013.01);
(Continued)

(58) Field of Classification Search
CPC ...... H02B 5/06; H02B 13/035; H02B 13/045; H02B 13/055; H02B 7/01; H01H 33/57; F17C 5/06; F17C 7/00
See application file for complete search history.

(56) References Cited

U.S. PATENT DOCUMENTS 3,619,527 A * 11/1971 Billon .................... H01H 33/57
218/83
3,701,867 A    10/1972 Henry et al.
(Continued)

FOREIGN PATENT DOCUMENTS

CN    101553651 A    10/2009
CN    103523017 A    1/2014
(Continued)

*Primary Examiner* — Robert J Hoffberg
(74) *Attorney, Agent, or Firm* — Laurence A. Greenberg; Werner H. Stemer; Ralph E. Locher

(57) ABSTRACT

An electrical energy transmission device for the transmission of electrical energy has a fluid-holding chamber. An electrically insulating fluid is contained in the fluid-holding chamber. The electrically insulating fluid is, at least in part, air-drawn from the surroundings of the electrical energy transmission device. The insulating fluid is used for insulating phase conductors in order to avoid short circuit conditions.

13 Claims, 1 Drawing Sheet

(51) Int. Cl.
  *F17C 5/06* (2006.01)
  *F17C 7/00* (2006.01)
  *H02B 13/035* (2006.01)
  *H02B 13/045* (2006.01)
  *H02B 7/01* (2006.01)

(52) U.S. Cl.
  CPC ......... *H02B 13/045* (2013.01); *H02B 13/055* (2013.01); *H02B 7/01* (2013.01)

(56) References Cited

U.S. PATENT DOCUMENTS

| | | | |
|---|---|---|---|
| 4,211,542 A | 7/1980 | Kramer | |
| 6,004,377 A * | 12/1999 | Tamata | B01D 53/685 |
| | | | 95/82 |
| 6,292,356 B1 * | 9/2001 | Yamagiwa | H02B 1/22 |
| | | | 218/70 |
| 6,797,336 B2 | 9/2004 | Garvey et al. | |
| 6,966,934 B1 * | 11/2005 | Sato | B01D 53/04 |
| | | | 55/467 |
| 7,439,630 B2 * | 10/2008 | Peacock | H02N 2/18 |
| | | | 290/1 R |
| 7,898,155 B2 * | 3/2011 | Peacock | H02N 2/18 |
| | | | 310/339 |
| 7,944,118 B2 * | 5/2011 | Peacock | H02N 2/18 |
| | | | 310/322 |
| 8,174,164 B2 * | 5/2012 | Peacock | H02N 2/18 |
| | | | 310/309 |
| 8,704,095 B2 * | 4/2014 | Claessens | H01H 9/02 |
| | | | 174/124 R |
| 8,748,770 B2 * | 6/2014 | Nakayama | H02B 13/0354 |
| | | | 218/7 |
| 8,822,870 B2 * | 9/2014 | Mantilla | H01H 33/22 |
| | | | 218/118 |
| 9,481,351 B2 * | 11/2016 | Kuang | B60W 30/182 |
| 9,928,973 B2 * | 3/2018 | Claessens | H01H 9/02 |
| 10,914,424 B2 * | 2/2021 | Sieber | F17C 7/00 |
| 2011/0148122 A1 | 6/2011 | Peacock | |
| 2012/0103941 A1 | 5/2012 | Nakayama et al. | |
| 2014/0005866 A1 | 1/2014 | Kuang et al. | |
| 2015/0008030 A1 | 1/2015 | Couture | |
| 2018/0135804 A1 | 5/2018 | Sieber et al. | |
| 2020/0280178 A1 * | 9/2020 | Barenthin | H02B 13/0354 |
| 2021/0193415 A1 * | 6/2021 | Glaue | B01D 53/70 |

FOREIGN PATENT DOCUMENTS

| | | | | |
|---|---|---|---|---|
| CN | 104170195 A | | 11/2014 | |
| DE | 2109965 A1 | | 9/1971 | |
| DE | 2633355 A1 | | 1/1978 | |
| DE | 2702763 A1 | | 7/1978 | |
| DE | 2702767 A1 | | 7/1978 | |
| DE | 3122886 A1 | | 1/1983 | |
| DE | 102012209307 A1 | | 12/2013 | |
| DE | 102015108748 A1 | | 12/2016 | |
| EP | 1441171 A2 | | 7/2004 | |
| GB | 1290648 A | | 9/1972 | |
| JP | 2001194409 A | * | 7/2001 | |
| KR | 101315995 B1 | * | 10/2013 | ........ G08B 21/182 |
| WO | 2004003252 A1 | | 1/2004 | |
| WO | 2016120022 A1 | | 8/2016 | |
| WO | WO-2019096589 A1 | * | 5/2019 | ........ H02B 13/055 |

\* cited by examiner

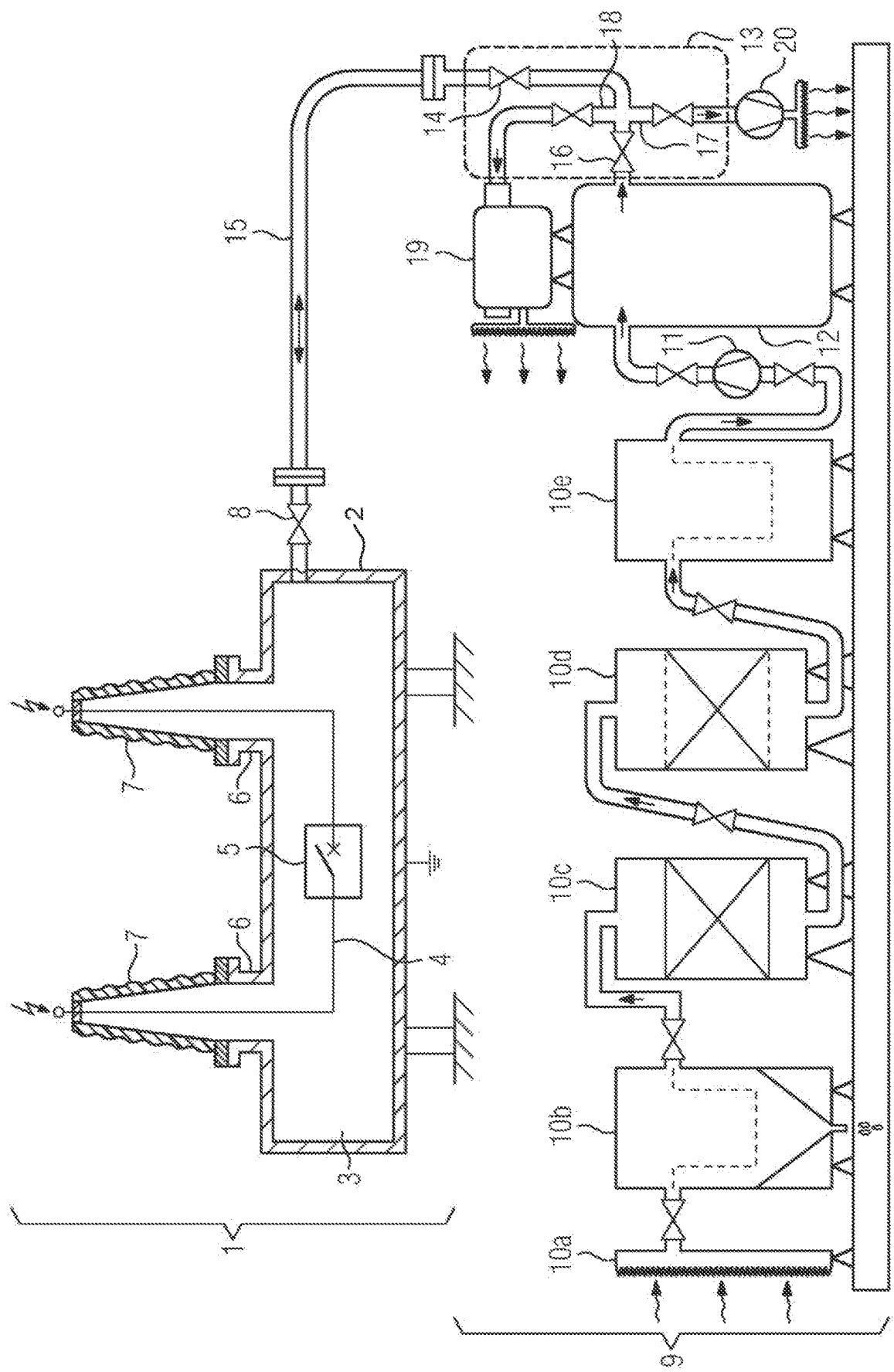

ELECTRICAL ENERGY TRANSMISSION DEVICE AND LIFE CYCLE MANAGEMENT

BACKGROUND OF THE INVENTION

Field of the Invention

The invention relates to an electrical energy transmission device having a fluid-holding chamber, in which an electrically insulating fluid is enclosed.

An electrical energy transmission device is known, for example, from European patent application EP 1 441 171 A2. The electrical energy transmission device therein has an encapsulation housing with a fluid-holding chamber, in which an electrically insulating fluid is enclosed. A technical gas is used therein as an electrically insulating fluid. Technical gases are produced in stationary devices. Transportation from the production location of the technical gas to the electrical energy transmission device is complex. Special environmental regulations often have to be complied with for the transportation. Further safety standards have to be taken into consideration in the case of the transportation of technical gases in pressure vessels. After the technical gas is drawn from the fluid-holding chamber, said technical gas has to in turn be transported away. The handling of gas is therefore a complex process.

Summary of the Invention

It is therefore an object of the invention to specify an electrical energy transmission device which can be insulated electrically in a simplified way.

In the case of an electrical energy transmission device of the type mentioned at the outset, the object is achieved by virtue of the fact that the fluid is formed at least partially by atmospheric air which is drawn from the surroundings of the electrical energy transmission device.

An electrical energy transmission device serves for a transmission of electrical energy. To this end, the electrical energy transmission device has a phase conductor which conducts an electrical current with loading of a potential difference. Here, the phase conductor of an electrical energy transmission device has to be insulated electrically, in order to avoid short circuits during voltage loading/current conducting. For the electrical insulation, the phase conductor can be flushed around at least in sections by an electrically insulating fluid. Here, an insulated section from the phase conductor to a component which conducts a different electrical potential is configured by way of the electrically insulating fluid. An insulated section can extend, for example, between the phase conductor and an encapsulation housing which delimits the fluid-holding chamber. The phase conductor is spaced apart, for example, from the encapsulation housing in an electrically insulating manner, and is preferably supported on the encapsulation housing in an electrically insulated manner. To this end, the encapsulation housing itself can have electrically insulating sections at least in sections. It can also be provided, however, that separate supporting insulators are arranged which support the phase conductor with respect to the encapsulation housing. Furthermore, the encapsulation housing can be formed at least in sections from electrically conducting materials. Electrically conducting sections of this type of an encapsulation housing preferably have a ground potential, with the result that there is defined potential conducting on the encapsulation housing.

An electrically insulating fluid is preferably arranged in liquid or gaseous form in a fluid-holding chamber. Here, the electrically insulating fluid is an electrically insulating material, it being possible for the electrically insulating fluid to have a chemical compound or else a mixture of different compounds. It is thus possible, for example, to use what is known as a carrier fluid which is enriched with a further fluid. As a result, a minimum dielectric strength of the electrically insulating fluid can be brought about in a manner which is dependent on the prevailing voltage and current conditions. The electrically insulating fluid can thus comprise, for example, mixtures with nitrogen, oxygen, carbon dioxide, sulfur hexafluoride, fluoroketones, fluoronitriles or other fluorine-containing compounds. The atmospheric air which is drawn from the surroundings can preferably serve as carrier fluid. The electrically insulating fluid can also be formed completely from atmospheric air which is drawn from the surroundings.

A composition of the fluid, at least partially comprising atmospheric air from the surroundings of the electrical energy transmission device, makes it possible that the required volume of technical gases which are to be synthesized at a distance from the installation site of the electrical energy transmission device is reduced. By way of a reduced requirement of technical gases, the complexity with regard to the transportation is reduced, as a result of which an advantage in cost and environmental terms is produced. The atmospheric air can be drawn directly in the vicinity of the electrical energy transmission device and can be introduced into the fluid-holding chamber. As a result, there is the possibility to form the fluid, for example, completely from atmospheric air which has been drawn from the surroundings of the electrical energy transmission device, or to utilize said atmospheric air, in order to enrich a fluid for the fluid-holding chamber. Here, in particular, the drawn atmospheric air can serve as carrier fluid. It can also be provided, however, that merely minor quantities of atmospheric air are contained in the fluid.

The electrically insulating fluid can be enclosed hermetically in the fluid-holding chamber. Here, the fluid in the fluid-holding chamber can be pressurized at a positive pressure, with the result that the electrically insulating properties are additionally improved. An encapsulation housing which delimits the fluid-holding chamber can then act as a pressure vessel.

A further advantageous refinement can provide that the atmospheric air is treated, in particular purified, locally.

Depending on the electrical requirements which are made of the fluid, the atmospheric air can be subjected to treatment, in order to ensure a minimum quality. This is advantageous, in particular, when electrical energy transmission devices are provided for use at different locations in different climate zones. As a result, a standardization of the fluid which is to be introduced into the fluid-holding chamber can be achieved by means of the treatment of the atmospheric air locally. For example, foreign substances such as dust, aerosols, organic compounds, foreign gases, etc. can be separated from the atmospheric air which is to be introduced into the fluid-holding chamber by way of a purification of the atmospheric air. A treatment of this type can vary depending on the installation site and/or depending on the electrical energy transmission device, and can comprise different stages. In addition to purification, a treatment can also comprise enriching of the atmospheric air. Enriching can take place, for example, by way of substances (in particular, fluid substances) which improve the insulation resistance, improve the stability, etc. A treatment can also comprise removal of substances from the fluid. Thus, for example, the oxygen content can be reduced by way of a treatment. A treatment can also comprise any other influencing/modifying of the fluid. For example, the fluid can be subjected to electromagnetic radiation. The treated atmospheric air can advantageously comprise a proportion of nitrogen of from approximately 65% to approximately 100%, in particular approximately 80%, and a proportion of oxygen of from approximately 0% to approximately 35%, in particular approximately 20%. What are known as zero air generators can be used for the treatment of the atmospheric air.

A further advantageous refinement can provide that the fluid-holding chamber is evacuated before filling of the fluid.

An evacuation of the fluid-holding chamber proves advantageous, in order to remove substances which are contained in the fluid-holding chamber, such as fluids such as, for example, undefined atmospheric air, and particles and aerosols which are situated in the fluid-holding chamber, from the fluid-holding chamber and to provide a fluid-holding chamber which is virtually free from particles. In the case of a treatment of the atmospheric air before an introduction into the fluid-holding chamber, in particular, it can thus be ensured that subsequent contamination and therefore influencing of the dielectric strength of the fluid are prevented.

A further advantageous refinement can provide that the atmospheric air is treated, in particular purified, before filling.

A treatment of the atmospheric air before it is filled into the fluid-holding chamber makes it possible to remove foreign substances which are contained in the fluid before filling of the fluid. Accordingly, a contamination of the fluid-holding chamber by way of untreated atmospheric air can be prevented.

A further advantageous refinement can provide that the fluid is discharged to the atmosphere.

A discharge of the fluid to the atmosphere makes it possible to dispense with disposal of the fluid, in particular if a majority of the fluid, in particular the entirety thereof, is formed from atmospheric air which is drawn from the atmospheric air, in particular is drawn from the surroundings of the electrical energy transmission device. A cost advantage can thus be achieved, since transportation of the fluid is dispensed with. A treatment of the fluid can possibly be provided before a discharge of the fluid to the atmosphere. The fluid can thus pass a catalytic converter, for example, in which foreign substances which are enriched in the fluid during operation of the electrical energy transmission device, for example, are converted. It can also be provided that filters are used for the treatment, in order to bind foreign substances. It is thus possible, for example, to convert or to bind aerosols such as oils in a catalytic converter/filter, with the result that the atmospheric air which is discharged to the atmosphere has a high degree of purity. A treatment can preferably serve to remove nitrogen oxides. Nitrogen oxides can be treated/converted in a catalytic manner.

The use or drawing of atmospheric air from the surroundings of the electrical energy transmission device allows, furthermore, a fluid to be refilled into the fluid-holding chamber in a simplified way in the case of servicing of the electrical energy transmission device, with the result that, for example, fluid losses can be compensated for. On account of the drawing from the surroundings, there is thus the possibility to dispense with a provision of storage vessels, for example, for a technical gas and instead to acquire the necessary fluid quantities as required from the surroundings of the electrical energy transmission device. Thus, for example, an automated monitoring device for the electrically insulating fluid can also be provided, which monitoring device possibly refills or else replaces the electrically insulating fluid in the fluid-holding chamber as required or at regular intervals.

It is a further object of the invention to specify a life cycle management system for an electrically insulating fluid which is to be arranged in a fluid-holding chamber of an electrical energy transmission device for the purposes of electrical insulation. Here, it is an object of the life cycle management system to provide an inexpensive method over the time of the use of the electrically insulating fluid, that is to say from the production of the electrically insulating fluid up to the disposal of the electrically insulating fluid.

In the case of an above-described life cycle management system, the object is achieved by virtue of the fact that atmospheric air is drawn from the surroundings, and the drawn air is treated and introduced into the fluid-holding chamber.

Drawing of atmospheric air from the surroundings, a treatment of the drawn air and an introduction of the treated air into the fluid-holding chamber makes it possible to fall back on natural resources to form a fluid. The fluid can be obtained in a simple way, transportation routes are shortened and, on account of the use of atmospheric air, the fluid can also be disposed again in a simplified way after an end of the use of the fluid in the electrical energy transmission device. This results in an inexpensive production of the fluid during the life cycle.

A further advantageous refinement can provide that the fluid is pressurized at a positive pressure.

The dielectric strength of the fluid can be increased additionally by way of pressurization of said fluid. To this end, a fluid-holding chamber, in which the electrically insulating fluid is arranged, can be delimited by an encapsulation housing which constitutes a pressure vessel. Accordingly, a positive pressure can be generated in the fluid-holding chamber. The dielectric strength of the electrically insulating fluid can be improved by way of the positive pressure, as a result of which the extent of the insulated sections which are to be provided for the purposes of insulation can be reduced.

Furthermore, it can advantageously be provided that the fluid-holding chamber is evacuated before the drawn air is introduced into said fluid-holding chamber.

The evacuation of the fluid-holding chamber before an introduction of the fluid makes it possible to maintain the quality standard (defined insulation resistance) which is achieved after a treatment of the drawn air even after being introduced into the fluid-holding chamber. Undefined foreign substances such as fluids are removed from the fluid-holding chamber by way of the evacuation, with the result that the treated air can be introduced into the fluid-holding chamber without being influenced disadvantageously. As a result of the evacuation of the fluid-holding chamber, it is possible to reduce the treatment of the drawn air to a minimum, since safety margins which are to be provided in order to ensure minimum standards for the treated air can be reduced.

Furthermore, it can advantageously be provided that the drawn air is buffer-stored in a storage volume, the storage capacity of the storage volume being smaller than the holding capacity of the fluid-holding chamber.

The drawn air can be buffer-stored in a storage volume, with the result that the air which is buffer-stored in the storage volume can be drawn as required at a later time. It can be provided here that the air which has already been treated is buffer-stored in the storage volume. It can also be provided, however, that untreated atmospheric air from the surroundings is buffer-stored in the storage volume. Here, the storage capacity of the storage volume should be smaller than the holding capacity of the fluid-holding chamber. As a result, the mobility of devices which are provided for the preparation of the atmospheric air can be maintained. Furthermore, a continuous treatment can be assisted by means of the storage volume, since, for example, fluctuations in the provision of air which is drawn from the surroundings can be compensated for by way of the storage volume.

A further advantageous refinement can provide that the fluid which is situated in the fluid-holding chamber is discharged to the surroundings.

By way of a discharge of the fluid into the surroundings, an inexpensive disposal of the fluid is possible in a simple way at the end of the life cycle. On account of the use of atmospheric air to form the fluid, the fluid which has been drawn once can be returned to the surroundings in the case of the discharge of the fluid, with the result that a closed circuit is formed. Furthermore, transportation routes can be reduced by way of the discharging of the fluid into the surroundings.

Furthermore, it can advantageously be provided that the fluid is treated, in particular purified, before the fluid is output to the surroundings.

Within the fluid-holding chamber, the fluid acts as electrical insulation, the electrically insulating fluid not being subjected to a change as a rule. Contamination of the fluid which is situated in the fluid-holding chamber can occur, however. This can take place, for example, as a result of damage, electric arc influences, etc. Undesired constituent parts can be removed from the fluid by way of a treatment, in particular by way of a purification of the fluid. Thus, for example, aerosols, decomposition products, etc. can be removed from the fluid. Nitrogen oxides can preferably be converted by means of a catalytic converter.

In the following text, one exemplary embodiment of the invention is shown diagrammatically in a drawing and is described in greater detail in the following text.

BRIEF DESCRIPTION OF THE DRAWING

In the drawing:
the FIGURE shows an electrical energy transmission device in cross section with a connected maintenance unit.

DESCRIPTION OF THE INVENTION

The FIGURE depicts an electrical energy transmission device 1 by way of example. The electrical energy transmission device 1 is configured by way of example as a fluid-insulated circuit breaker. The circuit breaker has what is known as a dead tank design. Moreover, any type of further refinements of electrical energy transmission devices 1 which have a fluid-holding chamber are also conceivable, however. Thus, for example, circuit breakers of a live tank design or what are known as gas-insulated switching systems can serve as electrical energy transmission devices 1. In addition to electrical energy transmission devices 1 with active modules (switchable modules) in the fluid-holding chamber, electrical energy transmission devices 1 can also have merely passive modules in the fluid-holding chamber. No switching operations occur in passive modules.

The electrical energy transmission device 1 has an encapsulation housing 2. Here, the encapsulation housing 2 is configured substantially as a hollow-cylindrical body with a substantially circular cross section. The hollow-cylindrical hollow body is closed in a fluid-tight manner on the end side. The encapsulation housing 2 delimits a fluid-holding chamber 3 in its interior. A phase conductor 4 is arranged in the fluid-holding chamber 3. In the present case, the phase conductor 4 is equipped with a switching device 5 (active module). The phase conductor 4 is mounted centrally in the encapsulation housing 2 and extends on both sides of the switching device 5 and within the switching device 5. In order to make electrical contact with the phase conductor 4, shell-side sockets 6 are arranged on the encapsulation housing 2. What are known as outdoor bushings 7 are arranged on the shell-side sockets 6. The outdoor bushings 7 serve to pass the phase conductor 4 in an electrically insulated manner through a wall of the encapsulation housing 2 into the surroundings of the electrical energy transmission device 1. The phase conductor 4 therefore runs, coming from the surroundings of the electrical energy transmission device 1, into the encapsulation housing 2, runs through the switching device 5 there, and leaves the encapsulation housing 2 again into the surroundings of the electrical energy transmission device 1.

The hollow-cylindrical main body of the encapsulation housing 2 is formed from an electrically conducting material. The electrically conducting sections of the encapsulation housing 2 are loaded with ground potential. The encapsulation housing 2 and the fluid-holding chamber 3 form a fluid-tight barrier, with the result that a fluid cannot escape from the fluid-holding chamber 3.

The encapsulation housing 2 has a filling fitting 8. The filling fitting 8 provides the possibility of filling the fluid-holding chamber 3 with an electrically insulating fluid and of removing an electrically insulating fluid from the fluid-holding chamber 3. To this end, the filling fitting 8 has a valve, by means of which the filling fitting 8 can be opened and closed. A maintenance unit 9 is provided for filling or emptying the fluid-holding chamber 3 of the electrical energy transmission device 1. The maintenance unit 9 is of portable configuration, with the result that the maintenance unit 9 can be assembled, for example, in a container or on a container platform. The maintenance unit 9 has a plurality of filter arrangements 10a, 10b, 10c, 10d, 10e. Each of the filter arrangements 10a, 10b, 10c, 10d, 10e serves to treat air which is drawn from the surroundings of the electrical energy transmission device 1. Here, the filter arrangements 10a, 10b, 10c, 10d, 10e are assembled in a cascading manner, with the result that the degree of purity of the atmospheric air which was drawn from the surroundings of the electrical energy transmission device is improved with an increasing number of filter arrangements 10a, 10b, 10c, 10d, 10e which have been passed. The filter arrangements 10a, 10b, 10c, 10d, 10e can also be called a zero air generator. The first filter arrangement 10a is configured as an air inlet, a large-area air inlet opening being provided with a grille-like barrier, in order to prevent a penetration of large foreign bodies into the maintenance unit 9. The first filter arrangement 10a is followed by a second filter arrangement 10b, in which particles and aerosols are removed from the inflowing air volume. For example, moisture can also be separated in the first filter arrangement, with the result that drying of the inflowing air takes place. There is then the possibility in a third filter arrangement 10c of removing hydrocarbons by way of oxidation from the inflowing air. A temperature control of the inflowing air can take place in order to promote the oxidation. In addition, a catalytic converter can be used, in order to convert gaseous hydrocarbons, for example, into carbon dioxide $CO_2$ and water $H_2O$ and to then remove them from the third filter arrangement 10c. There is then the possibility in a fourth filter arrangement 10d to further bind residual components of organic compounds, such as hydrocarbons, for example, by way of further treatment of the atmospheric air which is drawn from the surroundings by means of an adsorption filter. Mechanical purification of remaining foreign particles can then be performed in a superfine dust filter in a fifth filter arrangement 10e.

A passage of air through the filter arrangements 10a, 10b, 10c, 10d, 10e can be promoted by way of a fan. After a passage of the different filter arrangements 10a, 10b, 10c, 10d, 10e, there is then treated atmospheric air, in particular atmospheric air which is drawn from the surroundings in a purified manner. By means of a compressor 11, there is then the possibility to pressurize the treated atmospheric air which is drawn from the surroundings at a positive pressure, and to buffer-store it in a buffer store 12. The compressor 11 can assume the function of a fan, in order to convey an air flow through the filter systems 10a, 10b, 10c, 10d, 10e. For example, fluctuations during the treatment of the atmospheric air in the filter arrangements 10a, 10b, 10c, 10d, 10e can be compensated for by means of the buffer store 12. The outlet of the buffer store 12 is adjoined by a valve assembly 13. It is possible via different valves of the valve assembly 13 to allow treated atmospheric air which is buffer-stored in the buffer store 12 to flow into the fluid-holding chamber 3 of the electrical energy transmission device. To this end, the valve assembly 13 has an outlet valve 14. On the outlet side, the outlet valve 14 is provided with a coupling point, in order to establish a connection to the filling fitting 8 of the electrical energy transmission device 1 via a pipe system 15 which can be dismantled. The outlet valve 14 of the valve assembly 13 is in turn connected to a buffer store outlet valve 16. Closure of the buffer store 12 is possible via the buffer store outlet valve 16, with the result that a compressed treated air volume can be enclosed within the buffer store 12. It is possible to allow a compressed fluid to pass from the buffer store 12 into the fluid-holding chamber 3 by way of opening of the buffer store outlet valve 16 and the outlet valve 14 of the valve assembly 13.

An extraction tap line 17 and a discharge tap line 18 are arranged in the pipe system between the buffer store outlet valve 16 and the outlet valve 14 of the valve assembly 13. Both the extraction tap line 17 and the discharge tap line 18 can be closed in each case via a valve. The discharge tap line 18 opens into a catalytic converter 19, through which a fluid which is to be let out from the valve assembly 13 can be discharged to the surroundings. The catalytic converter 19 ensures a catalysis of foreign substances which are not to be discharged into the surroundings of the electrical energy transmission device. The catalytic converter 19 can serve, in particular, for a conversion of nitrogen oxides.

Filling of the fluid-holding chamber of the electrical energy transmission device 1 will be described in the following text.

It is assumed that the fluid-holding chamber 3 of the electrical energy transmission device 1 is filled with an undefined gas. First of all, the filling fitting 8 is opened. The buffer store outlet valve 16 is closed. The valve in the discharge tap line 18 is likewise closed. The valve in the extraction tap line 17 is open. The outlet valve 14 of the valve assembly 13 is likewise open. There is the possibility as a result to pressurize the fluid-holding chamber 3 at a negative pressure by means of a vacuum pump 20 which is situated in the extraction tap line 17. A vacuum can preferably be generated in the fluid-holding chamber 3. During the evacuation of the fluid-holding chamber 3, a purification of air which is acquired from the surroundings of the electrical energy transmission device can take place in parallel. To this end, air can be sucked in from the surroundings through the filter arrangements 10a, 10b, 10c, 10d, 10e, for example, by means of the compressor 11, whereupon the treated atmospheric air which is drawn from the surroundings can be pumped into the buffer store 12 and can be pressurized there at a positive pressure. The extraction tap line 17 can be closed in the event of a sufficient achievement of a vacuum in the interior of the fluid-holding chamber 3. The vacuum pump 20 can cease its work. There is then the possibility of opening the buffer store outlet valve 16 and allowing purified atmospheric air which is buffer-stored in the buffer store 12 to run into the valve assembly 13. Here, the purified air passes the outlet valve 14 and the filling fitting 8, and flows into the fluid-holding chamber 3 in a manner which is driven by way of a pressure difference. Here, the buffer store 12 is emptied at least partially. The volume of purified air which is drawn from the buffer store 12 can be compensated for by means of the compressor 11. Air continues to be sucked in via the filter arrangement 10a, 10b, 10c, 10d, and treated air continues to be introduced into the interior of the fluid-holding chamber 3. If a sufficient density (specific pressure at a specific temperature) is reached in the fluid-holding chamber 3, closure of the filling fitting 8 of the encapsulation housing 2 can be performed. Closure of the buffer store outlet valve 16 can likewise be performed. The compressor 11 can then be switched off as required, since further treated fluid is not required for the fluid-holding chamber 3 of the electrical energy transmission device 1. Should further fluid-holding chambers 3 of said electrical energy transmission device 1 or a further electrical energy transmission device 1 still have to be filled, an interim generation of compressed and purified air and buffer storing thereof in the buffer store 12 can also take place, however. It is then possible to dismantle the pipe system between the outlet valve 14, the valve assembly 13 and the filling fitting 8.

It is to be described in the following text how drawing of purified fluid from the fluid-holding chamber 3 can be performed. First of all, the filling fitting 8 and the outlet valve 14 are connected to one another via a pipe system 15. The buffer store outlet valve 16 is closed. The valve in the extraction tap line 17 is likewise closed. There is then the possibility to open the valve in the discharge tap line 18. Following this, the filling fitting 8 and the outlet valve 14 can be opened. In a manner which is driven by way of the positive pressure in the fluid-holding chamber 3, the fluid which is situated there flows via the filling fitting 8, the pipe system 15 and the outlet valve 14 into the discharge tap line 18 which is then open, and from there into the catalytic converter 19. There, a conversion of foreign substances is brought about by way of a catalysis, and the fluid which was previously drawn from the surroundings of the electrical energy transmission device 1 is fed back again to the surroundings of the electrical energy transmission device 1. In order to promote drawing of the fluid from the fluid-holding chamber 3, the arrangement of a pump can also be provided in the discharge tap line 18. If required, the extraction tap line 17 can also serve to discharge a fluid which is situated in the fluid-holding chamber 3 (optionally with a catalytic converter/filter). A negative pressure in the interior of the fluid-holding chamber 3 can ensure that the atmospheric air which was previously drawn from the surroundings is returned almost completely to the surroundings.

Drawing of a fluid from the fluid-holding chamber 3 via the maintenance unit 9 is ended by way of closure of the discharge tap line 18.

The invention claimed is:

1. An electrical energy transmission device, comprising:
   a maintenance unit configured for filtering atmospheric air which is drawn from surroundings of the electrical energy transmission device;
   a fluid-holding chamber for enclosing an electrically insulating fluid, the electrically insulating fluid being formed at least partially from filtered atmospheric air from the maintenance unit; and
   the electrically insulating fluid having the characteristics of having been filled into said fluid-holding chamber subsequent to an evacuation of said fluid-holding chamber.

2. The electrical energy transmission device according to claim 1, wherein the atmospheric air is filtered before filling of the electrically insulating fluid into the fluid-holding chamber.

3. The electrical energy transmission device according to claim 1, wherein the electrically insulating fluid is discharged to the surroundings via the maintenance unit.

4. The electrical energy transmission device according to claim 1, wherein the atmospheric air is purified in the maintenance unit.

5. The electrical energy transmission device according to claim 1, wherein the atmospheric air is purified in the maintenance unit before filling of the electrically insulating fluid into the fluid-holding chamber.

6. The electrical energy transmission device according to claim 1, further comprising:
   an outlet valve arranged between the maintenance unit and the fluid holding chamber;
   the outlet valve being configured to distribute the filtered atmospheric air from the maintenance unit to the fluid holding chamber; and
   the outlet valve being configured to discharge the electrically insulating fluid from the fluid holding chamber to the surroundings via the maintenance unit.

7. A method of operating a life cycle management system for an electrically insulating fluid disposed in a fluid-holding chamber of an electrical energy transmission device for purposes of electrical insulation, which comprises the steps of:
   drawing in atmospheric air from surroundings;
   filtering the drawn in air in a maintenance unit of the electrical energy transmission device;
   evacuating the fluid-holding chamber; and
   subsequently introducing the filtered air into the fluid-holding chamber as an electrically insulating fluid.

8. The method according to claim 7, which further comprises pressurizing the electrically insulating fluid at a positive pressure.

9. The method according to claim 7, which further comprises a buffer storing the filtered air in a storage volume.

10. The method according to claim 7, which further comprises discharging the electrically insulating fluid situated in the fluid-holding chamber to the surroundings.

11. The life method according to claim 10, which further comprises treating the electrically insulating fluid via the maintenance unit before the electrically insulating fluid is output to the surroundings.

12. The life method according to claim 10, which further comprises purifying the electrically insulating fluid before the electrically insulating fluid is output to the surroundings.

13. The method according to claim 7, which further comprises a buffer storing the drawn in filtered atmospheric air in a storage volume.

\* \* \* \* \*